US007316351B2

(12) United States Patent
Carlson

(10) Patent No.: US 7,316,351 B2
(45) Date of Patent: Jan. 8, 2008

(54) MARKING A DEPOSIT ITEM

(75) Inventor: Sven-Erik Carlson, Herrliberg (CH)

(73) Assignee: Trion AG, Volketswil (CH)

(*) Notice: Subject to any disclaimer, the term of this patent is extended or adjusted under 35 U.S.C. 154(b) by 216 days.

(21) Appl. No.: 10/476,953

(22) PCT Filed: May 7, 2002

(86) PCT No.: PCT/CH02/00248

§ 371 (c)(1),
(2), (4) Date: Jan. 2, 2004

(87) PCT Pub. No.: WO02/091313

PCT Pub. Date: Nov. 14, 2002

(65) Prior Publication Data

US 2004/0195306 A1 Oct. 7, 2004

(30) Foreign Application Priority Data

May 7, 2001 (EP) ................................ 01110966

(51) Int. Cl.
*G06K 5/00* (2006.01)

(52) U.S. Cl. ...................... 235/380; 235/381; 235/492; 235/493

(58) Field of Classification Search ........ 235/380-382, 235/449, 492-493, 451; 194/209-212, 205; 209/524, 583
See application file for complete search history.

(56) References Cited

U.S. PATENT DOCUMENTS

| | | | | |
|---|---|---|---|---|
| 4,248,334 | A * | 2/1981 | Hanley et al. | 194/209 |
| 4,449,042 | A * | 5/1984 | Hampson et al. | 235/454 |
| 4,492,295 | A * | 1/1985 | DeWoolfson | 194/213 |
| 4,579,216 | A * | 4/1986 | DeWoolfson et al. | 194/212 |
| 4,713,532 | A * | 12/1987 | Knowles | 235/462.4 |
| 4,717,026 | A * | 1/1988 | Fischer et al. | 209/539 |
| 5,161,661 | A * | 11/1992 | Hammond | 194/209 |
| 5,226,519 | A * | 7/1993 | DeWoolfson | 194/209 |
| 5,317,135 | A * | 5/1994 | Finocchio | 463/17 |
| 5,963,134 | A * | 10/1999 | Bowers et al. | 340/572.1 |
| 6,142,283 | A * | 11/2000 | Amdahl et al. | 194/205 |
| 6,164,551 | A * | 12/2000 | Altwasser | 235/492 |
| 6,577,861 | B2 * | 6/2003 | Ogasawara | 455/419 |
| 6,888,509 | B2 * | 5/2005 | Atherton | 343/718 |

* cited by examiner

*Primary Examiner*—Michael G. Lee
*Assistant Examiner*—Kumiko C. Koyama
(74) *Attorney, Agent, or Firm*—Notaro & Michalos PC

(57) ABSTRACT

In order to identify an item, on which a return deposit can be imposed, an element, which can at least be read in the radio frequency range and/or optionally one which can be switched or activated, are/is provided on the item. This element is activated optionally before or upon handing over the item and/or payment of a deposit for the item. The element is activated in such a manner that enables the item to be identified as one on which a deposit has been imposed. Before or upon returning the item, the element is read and, optionally when reimbursing the deposit, the element is activated and or deactivated in such a manner that enables the item to be identified as one on which a deposit is not imposed.

11 Claims, 3 Drawing Sheets

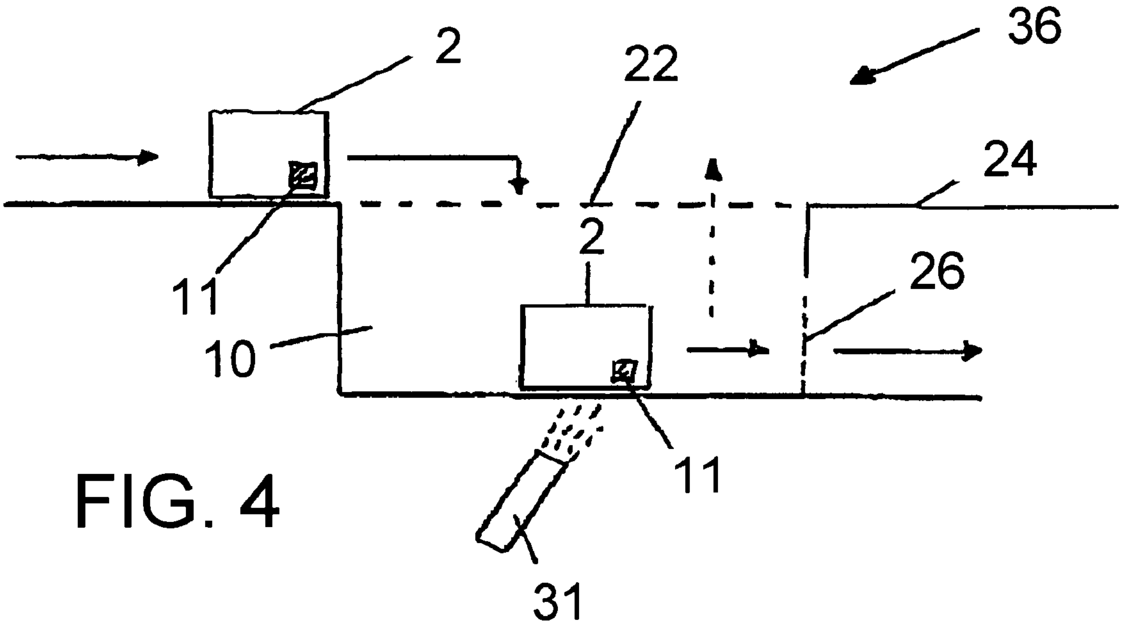
FIG. 4
FIG. 5
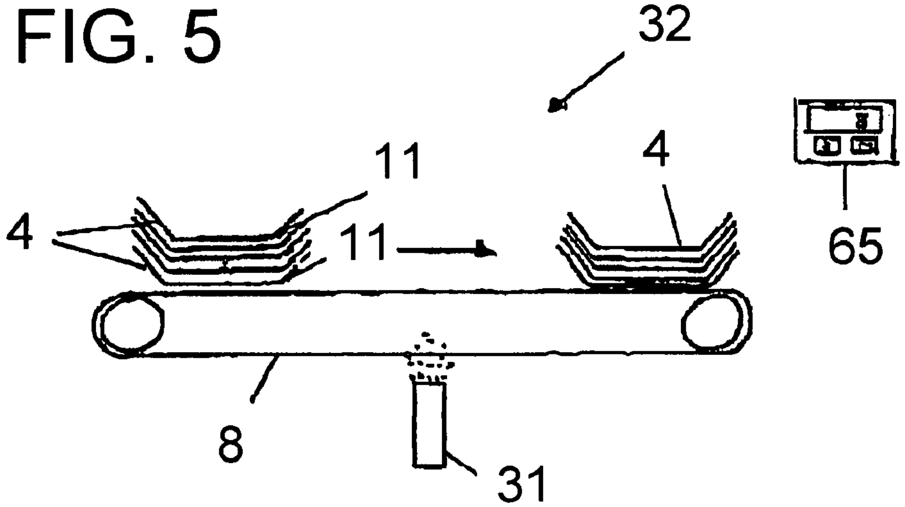

MARKING A DEPOSIT ITEM

FIELD AND BACKGROUND OF THE INVENTION

The present invention relates to a method for the identification of an object, on which a redemption deposit can be imposed, an object which must be identifiable, an application of the method as well as use of the object.

In goods, products, receptacles, such as bottles, containers and the like, in which a return/redemption is desired, as a rule a deposit is imposed when the objects are released. Therewith is attained that the released object is also brought back again, be that for example for environmental reasons or for reasons of regulation.

For one, it is often difficult to differentiate objects on which a deposit is imposed, such as bottles, from such introduced on the market without deposit, and, in addition, the need often exists to accept against payment of the deposit only "one's own" objects from a delivery site, such as for example a specific store chain. In addition, the wish exists of ensuring that for an object brought back on which a deposit is imposed the deposit is paid out only once and consequently misuse and manipulations with multiple unauthorized payments can be excluded. For these reasons it has until now been extremely difficult to determine whether or not a returned object at a delivery or redemption site with certainty is entitled to payment of deposit. Apart from the manual redemption, performed by employees, mechanical and electronic shape recognition systems and systems are known, which can read a bar code, such as for example an EAN or UPC code. These systems have the disadvantage that they are imprecise and/or can be manipulated and/or cannot carry out an identification at all or only with a high degree of imprecision, if the object is contained in a receptacle such as a container or a crate. Added to this in such devices is that misuse can be practiced by the personnel of the delivery or redemption site, in that objects entitled to deposit by the personnel itself can be passed several times through such devices, and the deposit consequently is collected several times.

SUMMARY OF THE INVENTION

The present invention therefore addresses the problem of proposing a method as well as devices connected therewith, by means of which the above listed problematic can be solved simply and cost-effectively. Said problem is solved by means of a method according to the invention.

What is proposed is that for the identification of an object, on which a redemption deposit can be imposed, an element switchable or activatable in or on the object is activated or written before or at the release of the object and/or payment of a deposit for the object, such that the object is identifiable as one on which a deposit is imposed and that, when taking back the object and return of the deposit, the element is activated or deactivated, deleted or overwritten such that the object can be identified as one on which a deposit has not been imposed.

The element located on the object is preferably an identification chip, a switching circuit or magnetic strip, which, when the object is released and a deposit has been paid for the object, is provided with the information that the object has a deposit imposed on it. When the object is redeemed and the deposit is returned, the information on the chip or switching circuit or magnetic strip is again deleted or overwritten or reset to "no deposit imposed".

In addition to the deposit information, further information, such as release site, release date, identification of content, identification number, etc., can preferably be transferred to the element, such as a chip, an integrated switching circuit or magnetic strip when the object is released, which further information, depending on the redemption site of the object, can be read when the object is redeemed and can be entirely or only partially deleted or changed. This further information can also include data regarding whether or not the object belongs to a specific "deposit system", i.e. that a deposit can be imposed for example only by a specific release site, such as a store chain, and accordingly is also paid out again only by a specific redemption site, such as said store chain. By means of the method defined according to the invention it can be prevented that objects identical per se, which are not entitled to carry a deposit, are included into this "deposit system".

The activation, data transfer or the writing upon release of the object or the reading, deactivation, overwriting and/or deleting of the data takes place according to a preferred embodiment variant by means of infrared, magnetic recording technology or by means of RFID technology (radio frequency identification).

Specifically in the latter case the data transfer to the object or between the objects onto an identification chip takes place through data transfer in the radio frequency range from a so-called interrogator (Read/Write apparatus) and the data from the chip can be read by a Read/Write apparatus and, if necessary, be changed, overwritten or deleted.

Stated differently, the communication between chip and interrogator occurs, for example, by means of radio waves.

A further problem addressed by the present invention relates to the identification of a disposable or multiuse object.

To solve this further problem a disposable or multiuse object is proposed, which must be simply and uniquely identifiable and which, if appropriate, preferably comprises an activatable or writable element, which is disposed in, on or at the object, and which can be writable with information or on or at which information can be applied, and this information can at least partially be deactivated, deleted or overwritten again.

The element is preferably fixedly connected with the object or preferably disposed integrally at, on or in it.

As identifiable element, which is preferably an activatable or writable element, is in particular suited a so-called RF identification chip, a magnetic strip or an integrated circuit, which at least can be read, optionally preferably actively written and/or can be switched on or off and the data stored thereon optionally preferably at least partially can be overwritten and/or partially deleted.

According to a preferred embodiment variant, as the element is proposed an RFID chip, which can be written and read, overwritten as well as at least partially deleted in the radio frequency range.

Such so-called RFID chips (Radio Frequency Identification) per se are already well known. These chips, which can be applied onto any object, can be, for example, so-called "smart labels", i.e. paper-thin, so-called "low cost data media" in the form of labels, which are employed as alternatives to so-called "bar codes". Known are also self-adhesive flexible data media, which, as a rule, based on the high-quality embodiment can be used as said "smart labels" under rougher operating conditions, such as in particular at higher operating temperatures. Lastly, rigid RFID chips or data media are also known, which can be applied on any carrier material. Such RFID chips, or also tags, are offered for sale, for example, by Gemplus, Montgomeryville USA, or ID Systems AG, 2557 Studen, Switzerland. The transmission frequencies vary in a range of approximately 50 kHz to 2.5 GHz. Conceivable per se is also the use of microwaves. The RFID systems currently employed commercially operate preferably in a range of 125 kHz to 13.5 MHz. But there are also systems of up to 800 MHz in development, and today even higher frequency ranges are under discussion. According to reliable sources, the production costs of said 800 MHz tags will only be a few Euro-cents.

An industry standard proper for this identification system utilizing said RFID chips has not yet been defined, at this time the most commonly used standards are the so-called I-code by Philips and the Tag-It standard by Motorola. But other solutions are also known. Such identification solutions are to some extent already employed in libraries, where books and videotapes are provided with such RFID chips. In this context reference is made for example to the International Patent Application WO 99/64974.

According to a further embodiment variant, the further problem is solved thereby that on the disposable or multiuse object an identification chip or semiconductor chip is disposed which can be read in the radio wave frequency range, optionally preferably also can be written again or deleted. It has been found that such identification chips, which can only be read in the radio frequency wave range, can already solve the problems or difficulties occurring with the EAN or UPC codes employed today.

The method defined according to the invention is suitable in particular for multiuse objects, such as bottles, receptacles, barrels, canisters, etc., which, provided with filling material, are released against a deposit and are taken back empty against the giving back of the deposit.

But, the method according to the invention is also suitable for the identifying of shopping carts or other objects, where an object is released which subsequently is given back again for reasons of regulations or economy.

But the method is also suitable for example for receptacles on which a deposit has been paid, such as for example bowls, which are used for selling food items such as meat and cheese. Such method is practiced, for example, by the company Eco Tray Systems in Holland.

The method according to the invention is, on the other hand, also suitable for disposable objects, such as for example PET bottles, batteries, TV sets, refrigerators, etc., which, for the purpose of correct disposal, are given back to an appropriately equipped redemption site or one provided for this purpose.

BRIEF DESCRIPTION OF THE DRAWINGS

In the following the invention will be explained in further detail by example and with reference to the enclosed Figures. Therein depict.

DESCRIPTION OF THE PREFERRED EMBODIMENT

Figure 1:
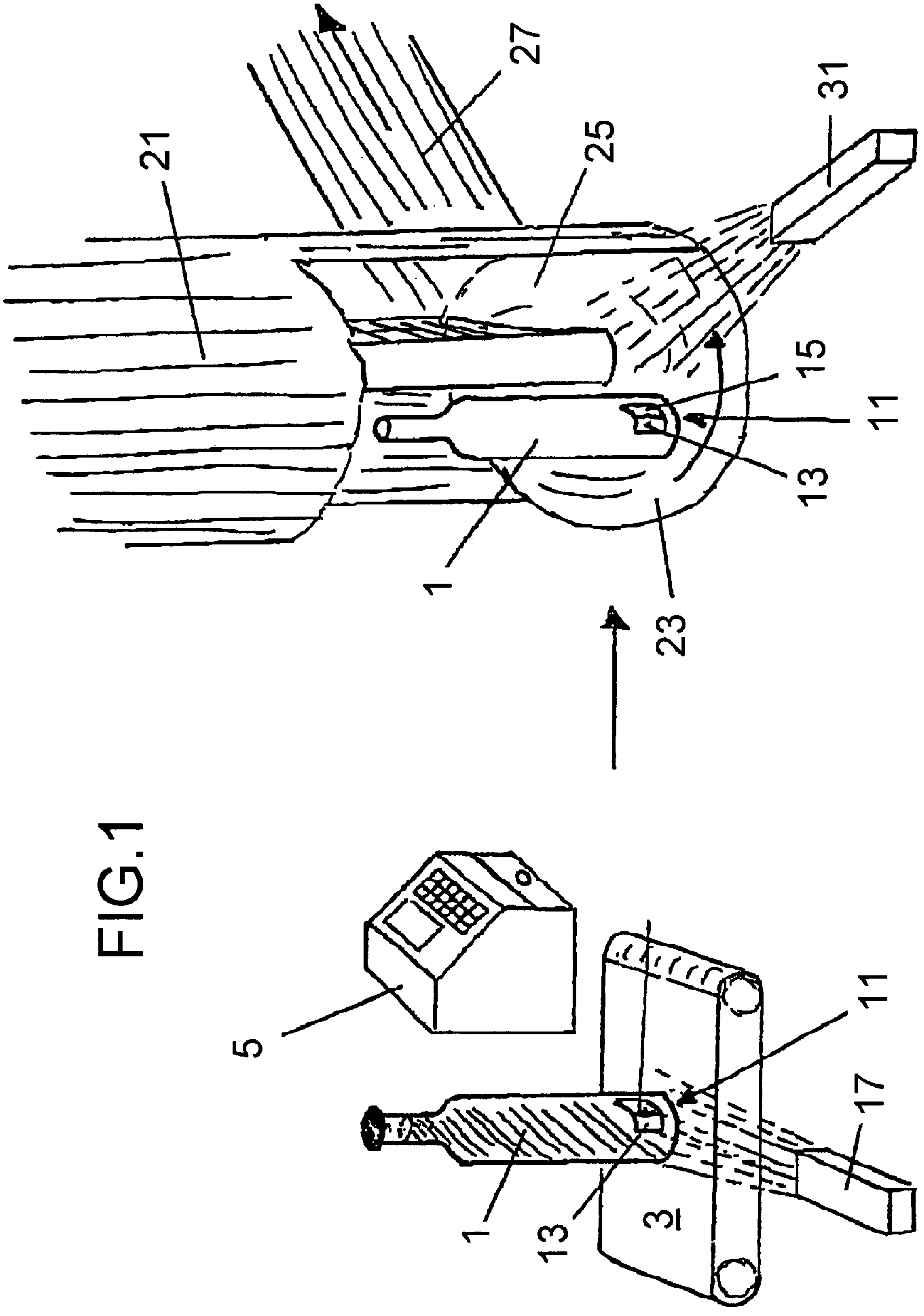
FIG. 1 schematically the basic principle of the present invention.

A filled bottle 1 is located on a conveyor belt 3 at a check-out counter 5 where payment is to be made for the bottle. In the lower region of the bottle 1 a label according to the invention with an identification chip 11 is disposed, which is developed, for example, in two parts, comprising, on the one hand, a region 13, which is reserved for object-related data, and a region 15, which is reserved for data relating to the deposit system. This chip can be for example a magnetic strip or an identification chip based on semiconductors. It is essential that this chip must be at least readable, preferably writable and preferably at least partially again deletable or overwritable. For this purpose a chip is preferably employed, which can be read or written in the radio frequency range. In this context, reference is made to the currently employed RFID (Radio Frequency Identification) technology, which appears to be especially well suited for the described application field. Such chips have a miniaturized radio antenna, and are for example applied on a thin polyester film, which chips can be disposed permanently on the surface of the bottle, for example provided with a protective layer laminated onto it. It is understood that it is also possible, to mould such a chip directly into the bottle wall, in particular if the bottle is comprised of synthetic material.

Region 13 can contain information, such as a unique product identification (for example an EAN or UPC code) and data relating to the material contained in the bottle, filling date, production lot, and the like, while in region 15 data can be found such as deposit system, store chain, whether a deposit had been imposed, as well as date sold. Specifically the latter information can be applied when paying and paying the deposit by means of a so-called interrogator 17, with the transmission taking place by means of radio waves. Such Read/Write apparatus or interrogators are offered for sale for example by the US company "Escort Memory Systems", Scotts Valley, 95066 California, a subsidiary of "Datalogic Group Company". This interrogator in the proximity of a check-out counter 5 is primarily a write apparatus, but which optionally can also be a read apparatus, if the issue is reading the data in region 13.

It is understood that the interrogator 17 is only primarily a write apparatus if the identification chip 11 is to be written, such as for example with respect to the above listed band information. In principle, it is already advantageous if a disposable or multiuse object, such as bottle 1, carries an identification chip 11 which is at least readable in the radio wave range.

An identification chip, at least readable in the radio wave range, has important advantages compared to the currently customary and known identification elements based on bar codes, such as for example the EAN or UPC code.

Now the so-called life cycle of the bottle 1 starts when it arrives at the consumer, there the content is consumed, and lastly the cycle ends when the bottle is again brought back. For this purpose special devices are disposed in shops, in which the empty bottles can be input. This can be, for example, a tower-like device 21, which has a circular rotatable disk 23 on which the empty bottle 1 is input. The bottle 1 now rotates in the direction of the arrow to arrive in a slot-like opening 25, at the entrance of which again an interrogator 31 is provided, which is at least a Read apparatus, preferably a Read/Write apparatus. For one, the interrogator 31 determines whether or not the deposit information in region 15 of the identification chip 11 meets the specifications, i.e. whether or not, for example, the deposit had been paid when purchasing the still filled bottle. This can be the case for example in that the identification chip 11 is activated. If this is the case, a counting pulse is generated to either return the money to the consumer directly, to issue a voucher to the consumer in the amount of the deposit, or to refund the deposit in some other way (credit card, customer account, etc.). After the deposit information has been registered by the interrogator 31, this deposit information must be deleted, so that a further deposit for the bottle 1 is refunded. But, it is understood that it is also possible to delete further information, such as those in the identification region 13, since now the bottle is, after all, emptied.

After passing through the slot-like opening 25, the bottle 1 lastly arrives via a conveyor belt 27 in an accumulation system provided for this purpose.

The interrogator 31 also operates preferably by means of radio frequency data communication. The great advantage of radio frequency data communication lies therein that sight contact between the interrogator and the identification chip does not absolutely need to be given. Consequently, it is also insignificant if a bottle is input rotated by 180° onto the disk 23 or, if the opening 25 is formed larger in order for crates also to be input, whether bottles are contained in a crate, since information on the identification chip 11 can also be read in this way by the interrogator 31 and subsequently can, for example, be deleted.

However, when returning several bottles in a crate, the problem of collision between the different identification chips exists. It may be necessary that, for example, the number of bottles must be determined before the identification. If a crate is full, then identification chips according to the number of bottles of a full crate must be identified and evaluated by the reading apparatus. This problem of the simultaneous multiple return of deposit objects will be discussed later with reference to FIG. 5.

Apart from the evaluation of whether or not an object carries a deposit, it is also possible to determine by means of the method according to the invention of the disposable or multiuse object defined according to the invention, to which deposit system or to which store chain the object belongs. In this way it is also possible to encourage a consumer to bring back an object to a specific site, if this is desired. In this case the identification chip is activated such that the deposit is only returned again at a specific delivery site. If the object is returned to another delivery site, the interrogator 31 identifies the appropriate information on the chip and refuses paying back the deposit or the acceptance of the object(s).

But, therewith the capability is also given to prevent that external objects are returned and that a deposit is erroneously paid.

Figure 2:
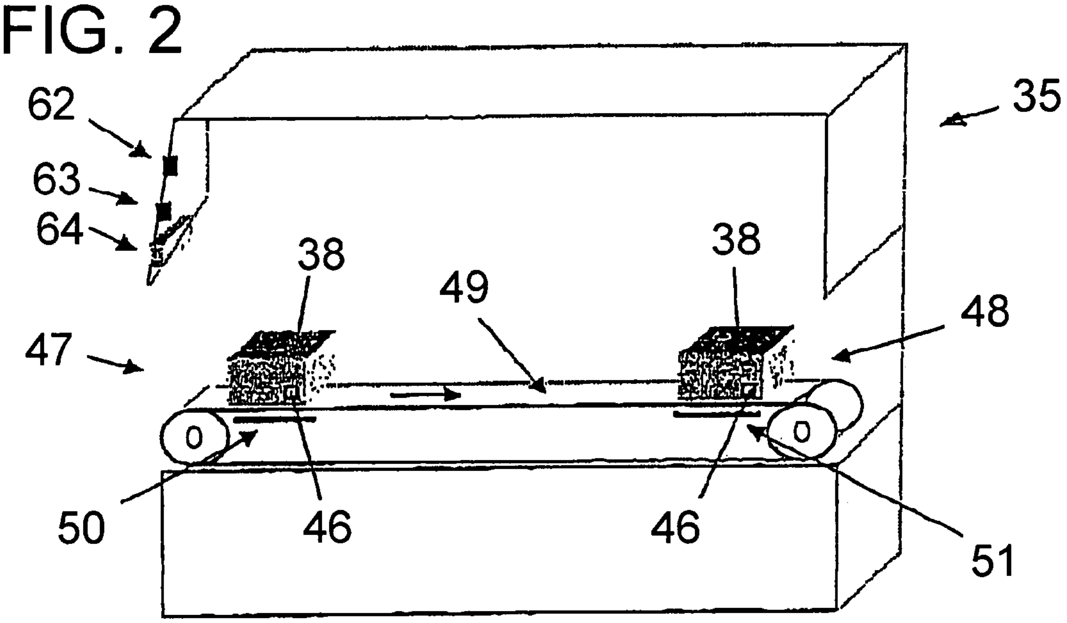
FIG. 2 schematically a preferred embodiment variant of a redemption station for objects on which a deposit has been imposed, FIG. 3 a further embodiment variant of a redemption station shown schematically, FIG. 4 again shown schematically a further embodiment of a redemption station for objects on which a deposit is imposed, and FIG. 5 shown schematically, a redemption station especially suitable for the simultaneous acceptance of several objects on which a deposit has been imposed.

FIG. 2 shows schematically a further embodiment variant of a redemption station, which, compared to the redemption device 21 of FIG. 1, entails advantages in so far as misuses can at least partially be excluded. The redemption station 35 comprises the following essential elements:

An input opening 47, into which a user can set or place objects onto a conveyor belt 40.

An output opening 48, from which the accepted objects 38 can be guided to a collecting system or a sorting system.

A transport system or a transport track 49, by which or by means of which objects 38 are transported from the input opening 47 to the output opening 48. The transport system 49 is preferably laid out such that it is optimally adapted to the properties such as dimensions, weight and material of the objects 38 to be redeemed.

An interrogator 50 or preferably concretely an RFID Read/Write apparatus or Read apparatus, which is placed at the input opening 47. The placement can take place laterally at the transport system 49 or at the top or bottom, depending on the properties or the objects 38 to be redeemed regarding dimensions, weight, material and the placement of RFID labels 46 on objects 38.

A further interrogator 51 or preferably concretely an RFID Read/Write apparatus, which is placed at the output opening 48. The placement, again, can take place laterally at the transport system 49 or above and below, depending on the properties of the objects 38 to be redeemed regarding dimensions, weight, material and placement of RFID labels 46. The placement of the interrogator 51 relative to the transport system 49 is preferably the same as that of interrogator 50 at the input.

A display 62 for communication with a user or the operating personnel.

A voucher button 63 for triggering a receipt, and lastly

A receipt output 64 for "deposit vouchers.

The operating function of the installation according to FIG. 2 is as follows:

The interrogator 50 detects the presence of a valid object 38, on which a valid RFID label 46 is applied and in which the deposit system identification is valid and the deposit payment entitlement, as before, is activated. In this case the conveying system 49 starts and guides the object 38 to interrogator 51. The latter deactivates the deposit payment entitlement and increases the customer credit balance. This process can be repeated until either the user person interrupts the operation of the installation, or until the interrogator 50 at the input no longer detects an object. A receipt is subsequently printed and the process is completed.

If the interrogator 50 reads an RFID label, which is a part of the current deposit system but has an already deactivated deposit payment entitlement, this is reported on the display 62 and a signal, such as for example a theft alarm, is triggered on an automaton. This can also be a silent alarm, for example to an employee with pager or the like. In the event, that it is running, the conveying system 49 is stopped simultaneously. After removing the wrong object, the information is no longer displayed on display 62 and any alarm is switched off immediately, after a certain time or after a manual receipt at the automaton. The conveying system 49 starts again to run, provided it had previously been stopped due to the error detection.

If an object 38 has successfully passed the interrogator 50, it reaches the interrogator 51, which reads the RFID labels 46 from the objects transported past it and, analogously to interrogator 50, checks again the deposit system identification and the deposit payment entitlement. If it is determined that the deposit system identification is in order and the deposit payment entitlement is activated, the object is registered by the automaton as having been accepted. This means that the deposit payment entitlement is deactivated or deleted and that relevant information for the subsequent deposit payment, for example product identification and deposit value, are read and stored. This can also optionally involve additional data for statistical and/or reporting purposes. If necessary, new information can also be written onto the memory chip 46 and/or old information can be deleted.

If the interrogator 51 reads an RFID label 46, which is not a part of the current deposit system, this is reported to the customer on the display and on the deposit voucher. In this case no manipulations are carried out on the content of the RFID label. Information is optionally read and stored for statistical and reporting purposes.

If the interrogator 51 reads an RFID label 46, which is a part of the current deposit system, but one with a deactivated deposit payment entitlement, this is displayed on display 62 and a signal, such as for example a theft alarm, is triggered on the automaton and/or a silent alarm; possible is also a remote alarm for example to an employee with pager. The conveying system 49 is simultaneously stopped, in the event that it is running. After removing the wrong object, the information on the display 62 ceases to be displayed, as well as any alarm, either immediately, after a certain time or after a manual acknowledgement at the automaton is deactivated. The conveying system 49 again starts running, provided it had previously been stopped by the error detection.

When the user or a customer presses the voucher button 63, the automaton checks, for example, whether or not a certain time interval has passed since the interrogator 50 has read the last RFID label with valid deposit system identification and activated deposit payment entitlement. A certain waiting time since the interrogator 51 has registered the last valid object also passes. The passing of this time should preferably also be completed before the printing of the receipt voucher takes place so that objects, potentially dwelling in the system, have time to be acquired at the interrogator 51 and in this way are also acquired on the receipt. The receipt, apart from statements of deposit values, can also contain additional relevant information about the accepted objects. Such information is registered and stored for each object by interrogator 51. However, if a user or a customer has triggered a theft alarm during the servicing, output of a receipt is, of course, interrupted until a supervisor of the automaton has acknowledged the alarm on the automaton.

Transport system 49 preferably runs a certain programmed time after the interrogator 50 has read the last RFID label with valid deposit system identification and activated deposit payment entitlement, and also a certain time, after the interrogator 51 has registered the last valid object 38, so that, before the transport system 49 is switched off, all objects 38 reliably in the output opening 48 have been transported away and been supplied, for example, to a sorting system.

In the redemption device described with reference to FIG. 2, the possibility of misuse of the deposit system is greatly reduced. While it is physically possible at any time to withdraw an object already evaluated, as a rule, an alarm is, however, triggered, which means if a theft attempt is carried out before a receipt is printed, the receipt output is stopped until the operating personnel unblocks a triggered alarm. Consequently, in this case a thief has gained nothing. However, if the customer waits until a receipt is printed, he can very well subsequently start to withdraw objects which have already have been registered and deactivated or to steal them from the collecting system. However, objects stolen in this way with respect to deposit are worthless since the deposit entitlement had already been deactivated in the redemption device or in the automaton.

But, theoretically it is, of course, also possible that a user attempts to disturb the detection system through external action, such as for example by inserting a metal plate into the output opening 47. Or attempts could also be made to circumvent the detection through rapid withdrawing of the object through a region covered not at all or only poorly by the measuring system. As a countermeasure, it would be reasonable in this case that along the transport system 49 optical sensors, such as photoelectric cells, are disposed, which monitor the direction of the movement of the input objects. For example, a retromotion of an object can be detected and an alarm can be triggered. But it is also possible to locate a metal detector at the input opening 47, which detects whether or not metal objects are input into the input opening. This can take place for example through measurements of the inductance at the input opening 47. If unusual values are detected, an alarm is triggered and, according to the above description, the transport system 49 is stopped and the output of a receipt is interrupted.

According to a further embodiment variant, it would be conceivable to omit the interrogator 50 and to replace it by said optical sensors, such as photoelectric cells, along the transport system 49. This solution causes the conveying system 49 to be set into motion through the actuation of an optic light barrier, and not by the positive detection of a deposit-entitled object.

Figure 3:
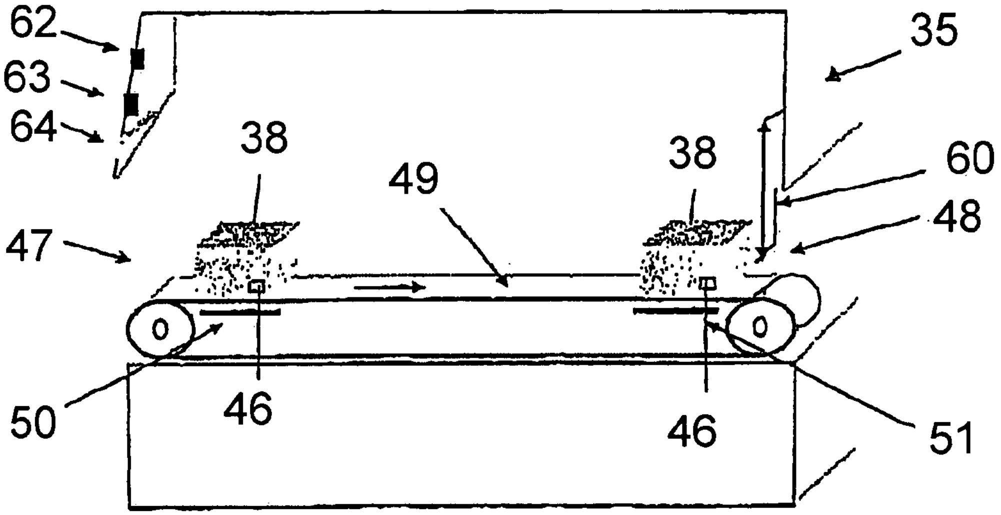

In FIG. 3 a further embodiment variant of a redemption device 35 is shown schematically. In this device or automaton 35 according to FIG. 3 additionally the following measures are provided with respect to FIG. 2:

At the output opening 48 of the automaton 35 is disposed a door or lock 60 which can be realized in any desired form, such as drop door, swing door, slide, etc. The operating function of the automaton 35 is as follows:

When the automaton is not in use, the door 60 is closed, i.e. it is prevented that a user can withdraw an object 38 once it has been input and for which the deposit has been refunded, with his hand or by means of a cord. Only when the transport system 49 has started up and a first object has been accepted by the interrogator 51, does the door 60 open and close as soon as all input objects have been reliably transported away from the output opening 48 and have been supplied to a collection system or sorting system. The receipt output at the automaton 35 occurs only if the door 60 is closed again.

In the type of automaton 35 according to FIG. 3 the problem encountered with withdrawing objects after the output of the receipt is solved. For this purpose the door 60 is mounted at the output of the automaton 35, which is only open during the customer servicing and is closed after each servicing. A condition for the receipt output is additionally that all objects are transported out of the automaton and the door is closed again. There are hardly any possibilities for manipulation. If, after the input, the thief attempts to keep the door artificially open, his receipt will never be printed—potentially even an alarm is triggered.

The opening of the door or lock 60 can take place, for example, in two ways:

- either, if the interrogator 50 during the input sees a deposit-entitled object or
- if interrogator 51 during the output 48 sees and registers a deposit-entitled object.

The first method is highly unfavorable, since with it a thief only needs to hold a deposit-entitled object at the input opening 47 in order to open the door. The first solution is therefore equivalent to the solution depicted in FIG. 2. The second method, in contrast, is very efficient, since the object 38, used to open the door, itself becomes deactivated so that the door opens. Which means that a thief when leaving the automaton has at least lost the deposit money for one object. Moreover, the time during which the door 60 is open, in this way is kept to a minimum.

In FIG. 4 a further embodiment variant of a redemption device 36 is shown which practically makes misuse entirely impossible. An object 2, provided with the RFID label 11, is input through a reclosable opening 22 in a working plane 24 into a chamber 10, whereupon the reclosable wall 22 is closed. Now the label 11 is read by the interrogator 31 and, for example, the deposit entitlement activated. If association with the deposit system and deposit entitlement are free of objection, a second, again, closable wall such as door 26 is opened and the object 2 is removed from chamber 10. Subsequently the door 26 is closed and the first such reclosable wall or door 22 is again opened for the input of a further object 2 into the chamber 10. With this device 36 the misuse is virtually entirely impossible. Specifically the redemption device 36 of FIG. 4 is suitable, for example, for the redemption of books in libraries and the like.

FIG. 5 lastly shows a redemption device 32 spatially suitable for the simultaneous redemption of several deposit-entitled objects. Again, several objects 4, provided with RFID labels 11, are input onto a conveyor belt 8 and guided past an interrogator 31. These can be for example food bowls, which are placed stacked one into the other onto the conveyor belt 8. Or the objects can be a bottle crate containing several bottles. Again, the interrogator 31 reads the RFID labels 11, and a determination is carried out of how many of the input objects, on the one hand, belong to the deposit system and, additionally, how many of these objects are entitled for deposit redemption. The number of objects, whose labels 11 meet both requirements, is displayed on a display 65 and the user or customer can check whether the number detected by the interrogator agrees with his conception. If this is the case, he can confirm the detected number and a receipt is issued accordingly. If his conception does not agree with the display, he has the option of not confirming, whereupon all objects or the entire crate are taken out the system or whereupon the conveyor belt 8 is stopped. The problematic with this multiple return consists in the deactivation of the labels, in that either the RFID labels or the deposit entitlement are only deactivated after the OK confirmation by the customer, whereby a certain theft or erroneous manipulation susceptibility of the redemption device 32 is given.

If the deposit entitlement is already deactivated before the confirmation by the customer, the problematic consists therein that with non-confirmation by the customer the labels are deactivated and consequently the customer receives absolutely nothing.

A further problem lastly consists therein that occasionally objects are already offered in the sales locations which have a deposit-entitlement label. In other words, the deposit entitlement is not activated at the check-out counter when paying for the object, but rather, for example for reasons of savings to be able to avoid a write apparatus at the check-out counter, the labels are already activated. Thus, the option is given that a customer can input bottles which are still full to the redemption device and in this way receives a deposit for a bottle which is still filled, which he has not paid for or whose content he never consumed. In order to counter this problem, the possibility exists that for example at the input opening 47 at the redemption device a balance is disposed in order to weigh the input object. If this is much too heavy the conveyor belt 49 is stopped.

Lastly, it is also possible to provide an additional field on the label to determine whether the object is in the "consumer circulation" or in the "producer/supplier" circulation. Both label segments can be activated or deactivated. It is understood, that the simultaneous activation of the two label fields are not desired, but rather it must always be clearly defined in which circulation segment an object is located.

The examples depicted in FIGS. 1 to 5 serve only for an elucidation of the inventive idea. It is understood that the present invention is by no means limited to the conditions shown in the Figures, and acceptance as well as redemption sites can be implemented entirely differently from those shown in the described Figures. The object also does not need to be a multiuse object but rather the present method is also suitable for disposable objects, which, for example, are to be given back to a suitable site for environmental reasons. But with the method according to the invention, it can also be prevented that, by introducing waste disposal fees, objects no longer used are disposed of carelessly. Due to the imposed deposit, it is in any event worthwhile to bring back an object to the appropriate site provided for this purpose instead of disposing of it carelessly. For example, when selling a television set a deposit can be imposed simultaneously, which at least partially is paid back if the television set is given back to the appropriate site and is disposed of when the television set is no longer used.

It is furthermore conceivable that when redeeming the object that not a specific amount is paid or credited but rather that simultaneously the option exists of crediting the stake directly to a non-profit institution or to use it as a wagering stake. It is also possible with the simultaneous return of 10 or another number of objects to pay an additional bonus, such as for example a special verified voucher. It is possible, for example, to provide at the redemption station a keyboard, with which the customer can enter his preference for payment or utilization of the deposit.

In other words, the present invention is by no means restricted to any specific object or to a specific deposit type, but rather can be applied wherever a unique identification or marking of a disposable or multiuse object is necessary and optionally return, correct disposal or recycling of a released object is either desirable or meaningful or necessary.

The invention claimed is:

1. A method for releasing and returning an object on which a redemption deposit is imposed when the object is released, and for ensuring that the redemption deposit is only paid once when the object is returned by identifying the object and determining if the deposit is due or not due, the method comprising:

providing a self-contained element on the object that switches between a first state indicating that the object has been released and that the redemption deposit is due, and a second state indicating that the object has been returned and that the redemption deposit has been paid and is no longer due;

reading the element to determine whether the element is in the first state so that the redemption deposit is due, or in the second state so that no redemption deposit is due, without reference to any information that is outside the element and so as to determine whether the redemption deposit should be paid or not;

providing a region having an input for return of the object;

conveying the object to the region using a transporting device;

providing a first detection device in the region for reading the element on the object;

evaluating data read by the first detection device to determine whether the element is in the first state or the second state;

displaying the state that the element is in so that if the element is in the first state, payment of the redemption deposit is allowed, and if the element is in the second state, payment of the redemption deposit is withheld; and providing a second detection device between the input and the first detection device for detecting association information on the element that indicates an association of the object with a selected deposit system, the second detection device being coupled to the transport device for interrupting conveying of the object if said association information is not read.

2. The method of claim 1, including providing the element to be an identification chip or a magnetic strip.

3. The method of claim 1, wherein the element comprises an identification chip or a magnetic strip, the method including storing on the element, at least one piece of additional information selected from the group consisting of: an identity of a release site, a release date, an identity of a content of the object, an identification number, and an identity of a deposit system, and using the additional information to determine whether the element may be switched between the first and second states.

4. The method of claim 1, including reading the element to determine whether the element is in the first state or the second state by one of: infrared signals, magnetic recording and radio frequency identification.

5. The method of claim 1, including switching the element between the first and second states using one of infrared signals, magnetic recording or radio frequency control.

6. An arrangement for identification and return of an object on which a redemption deposit is imposed, and for determining if the deposit is due or is not due, comprising:

a self-contained element on the object that switches between a first state indicating that the object has been released and that the redemption deposit is due, and a second state indicating that the object has been returned and that the redemption deposit has been paid and is no longer due, the element is read to determine whether the element is in the first state so that the redemption deposit is due, or in the second state so that no redemption deposit is due, without reference to any information that is outside the element so as to determine whether the redemption deposit should be paid or not;

a region having an input for return of the object;

a transport device in the region for conveying the object;

a first detection device in the region for reading the element on the object;

a circuit connected to the first detection device for evaluating data read by the first detection device to determine whether the element is in the first state or the second state;

a display for displaying the state that the element is in so that if the element is in the first state, payment of the redemption deposit is allowed, and if the element is in the second state, payment of the redemption deposit is withheld; and a second detection device between the input and the first detection device for detecting association information on the element that indicates an association of the object with a selected deposit system, the second detection device being coupled to the transport device for interrupting conveying of the object if said association information is not read.

7. The arrangement of claim 6, wherein element is an RFID label, the first and second detection devices being RFID interrogators for reading or writing the RFID label.

8. The arrangement of claim 7, including an output region downstream of the input for receiving each object released by the transport device only if the first and the second detection devices have detected the object to be entitled to payment of the deposit, and associated with the selected deposit system.

9. The arrangement of claim 8, including an alarm sender for issuing an acoustic or visual alarm if the first and second detection devices have detected the object to be unentitled to payment of the deposit, or not associated with the selected deposit system.

10. The arrangement of claim 9, including a servicing member for trigger payment of the deposit or for display the deposit payment, or for trigger printing of a receipt for payment of the deposit, if the first and second detection devices have detected the object to be entitled to payment of the deposit, and associated with the selected deposit system.

11. The arrangement of claim 10, including a displaceable wall which is coupled to the first and second detection devices, operable so that upon positive identification of the element with respect to association to the deposit system and deposit payment entitlement, the wall is opened for passaged of the object, and, after passage of the object, the door is closed.

* * * * *